United States Patent [19]

Shinozuka et al.

[11] Patent Number: 5,750,592
[45] Date of Patent: May 12, 1998

[54] INK COMPOSITION FOR INK JET RECORDING

[75] Inventors: Masakazu Shinozuka; Yoshinori Miyazawa; Makoto Fujino; Tatsuya Ito; Osamu Ishibashi, all of Suwa, Japan

[73] Assignee: Seiko Epson Corporation, Tokyo-To, Japan

[21] Appl. No.: 101,412

[22] Filed: Aug. 3, 1993

[30] Foreign Application Priority Data

| | | | |
|---|---|---|---|
| Aug. 4, 1992 | [JP] | Japan | 4-208193 |
| Oct. 7, 1992 | [JP] | Japan | 4-268835 |
| Apr. 21, 1993 | [JP] | Japan | 5-094528 |
| Apr. 21, 1993 | [JP] | Japan | 5-094535 |

[51] Int. Cl.$^6$ .................................. C09D 11/10
[52] U.S. Cl. ............ 523/161; 524/377; 524/430; 524/496; 524/832; 260/DIG. 38; 106/31.28; 106/31.33; 347/56
[58] Field of Search .............. 523/161; 346/140 R; 260/DIG. 38; 106/20 D; 524/496, 430, 832, 377

[56] References Cited

U.S. PATENT DOCUMENTS

| | | | |
|---|---|---|---|
| 4,532,276 | 7/1985 | Knäble | 523/161 |
| 4,848,744 | 7/1989 | Endo et al. | 364/140 R |
| 4,920,361 | 4/1990 | Arahara et al. | 364/140 R |
| 5,190,582 | 3/1993 | Shinozuka et al. | 106/20 D |

FOREIGN PATENT DOCUMENTS

| | | | |
|---|---|---|---|
| 49027125 | 7/1974 | Japan . | |
| 1083269 | 4/1986 | Japan | 523/161 |
| 62-092849 | 4/1989 | Japan . | |
| 2105877 | 4/1990 | Japan . | |
| 2231056 | 11/1990 | United Kingdom . | |

OTHER PUBLICATIONS

Derwent Publications Ltd. London, GB; AN 90–166646, Apr. 1990 Database Week 9022.
Derwent Publications Ltd. London GB; AN 74–57821V, Jul. 1974, Database, Week 7432.
Derwent Publications Ltd. London GB; AN 90–166646, Apr. 1990 Database Week 9022.
Derwent Publications Ltd., London GB; AN 74–5782IV, Jul. 1974, Database, Week 7432.

*Primary Examiner*—Vasu Jagannathan
*Assistant Examiner*—John J. Guarriello
*Attorney, Agent, or Firm*—Ladas & Parry

[57] ABSTRACT

An ink composition for intermediate transfer ink jet recording, comprising water, a pigment, a colloidal dispersion resin, a volatile alkali component and a water-soluble organic solvent. The ink composition provides an excellent print quality and a good fixing strength independently of the kinds of recording media.

13 Claims, 6 Drawing Sheets

INK COMPOSITION FOR INK JET RECORDING

BACKGROUND OF THE INVENTION

1. Field of the Invention

The present invention relates to an intermediate transfer ink jet recording method and an ink composition for intermediate transfer ink jet recording used in said method.

2. Background Art

An ink jet recording system is advantageously excellent in the simplicity of the mechanism and noiseless. This type of printing, however, has problems including that the quality of prints varies depending upon the kinds of recording media, for example, the quality of recording paper and the image of a portion remaining undried of an ink image is disturbed during the discharge of the recording medium. In order to cope with such problems, a proposal has been made on a method called an "intermediate transfer system" wherein an ink image is once formed on a transfer medium by an ink jet recording system and then transferred to a recording medium (see Japanese Patent Laid-Open No. 225958/1984 and U.S. Pat. No. 4,538,156). In this method, the recording head can disposed apart from the recording paper. Consequently, this method has a feature that it is possible to prevent the contact of the recording head with the recording paper caused by the disposition of the recording head in close proximity to the recording paper or the clogging of the recording head attributable to the collection of paper lint on the recording head. However, in the above-described transfer ink jet recording device, there is room for an improvement in the quality of the image transferred on the recording medium.

Further, Japanese Patent Laid-Open Nos. 92849/1987, 169643/1991 and 284948/1991 and U.S. Pat. No. 5,099,256 proposes a method which once ejects ink droplets on a transfer medium to form an ink image, evaporating a large proportion of water in the ink image to dehydrate the ink image to a substantially dry state and transferring the concentrated ink to recording paper. In the transfer ink jet recording device, since the bonding strength between the recording medium and the ink image is small, a high pressure is necessary for transferring the ink image to the recording medium. The provision of means for applying necessary pressure renders the recording device complicate.

SUMMARY OF THE INVENTION

Accordingly, an object of the present invention is to provide an ink composition for intermediate transfer ink jet recording that enables an excellent quality of prints and a good fixing strength to be attained independently of the kinds of recording media used.

Another object of the present invention is to provide an ink composition for intermediate transfer ink jet recording that is free from the clogging of the ink jet head and can simplify the transfer and fixing operation.

A further object of the present invention is to provide an intermediate transfer ink jet recording method using the above-described ink composition for ink jet recording, which method enables an excellent quality of prints and a good fixing strength to be attained independently of the kinds of recording media used.

A further object of the present invention is to provide an intermediate transfer ink jet recording method that enables a good ink image to be transferred from an intermediate transfer medium to a recording medium under low pressure.

According to one aspect of the present invention, there is provided an ink composition for intermediate transfer ink jet recording, comparing:

water;

a pigment;

a colloidal dispersion resin;

a volatile alkali component; and a water-soluble organic solvent.

According to another aspect of the present invention, there is provided an intermediate transfer ink jet recording method comprising the steps of:

ejecting the above-described ink composition on an intermediate transfer medium to form an ink image;

concentrating said ink image; and transferring said ink image heated on said transfer medium to a recording medium.

BRIEF DESCRIPTION OF THE DRAWINGS

FIGS. 5a–c are diagrams showing a device used for practicing the ink jet recording method according to the present invention, wherein FIG. 5(a) shows a device wherein an image is intermittently formed as a striped region on a transfer drum, FIG. 5(b) shows a device wherein an image is spirally formed on a transfer drum and FIG. 5(c) shows a device wherein a nozzle is provided over the whole printing region;

FIGS. 6a,b are diagrams showing an ink jet recording device, wherein FIG. 6(a) shows an ink jet recording device wherein a heater is provided outside a transfer drum and FIG. 6(b) shows an ink jet recording device wherein a heater and a transfer drum are integrally provided.

DETAILED DESCRIPTION OF THE INVENTION

Ink Composition

Figure 1:
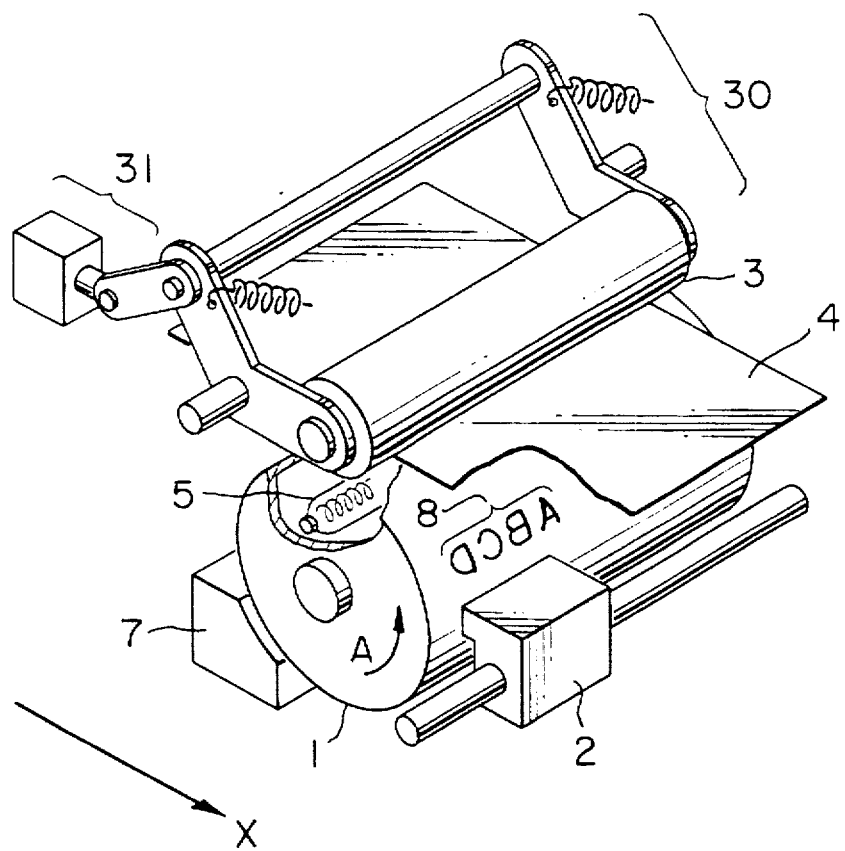
FIG. 1 is a perspective view of an ink jet recording device for practicing the ink jet recording method according to the present invention.

The ink composition according to the present invention is a water-based ink composition, and the major solvent is water. Water is particularly preferably pure water or ultrapure water subjected to purification process, such as ion exchange or distillation. Examples of advantages attained by the use of water include low viscosity, excellent safety, no adverse effect on human body, easy handling, low cost and freedom from odor.

(Colloidal Dispersion Resin)

The colloidal dispersion resin used in the ink composition according to the present invention means that a resin in the state between dissolution and dispersion is present in a solvent.

More specifically, colloidal dispersion resin means resin that is obtainable by introducing a carboxy group into a polymer called a "resin emulsion" comprising polymer particles dispersed in a solvent or by polymerizing a monomer having a carboxy group, and then neutralizing the polymer particles thus obtained with an alkali to enhance the hydrophilicity of the polymer particles to bring the polymer particles to a semi-dissolved state. (see B. J. Sauntson, Brit. Ink Mcoak., 18 (1), 26 (1975); and Jiro Aihara, Insatsu Inki Nyumon (Introduction to Printing Inks), p. 114: Publishing Department of Insatsu Gakkai, Japan). Interestingly, the ink composition containing the colloidal dispersion resin is suitable for use in the so-called "intermediate transfer ink jet recording method". Specifically, it becomes possible to use a mode of transfer called "interfacial transfer" which will be described later, so that a print having an excellent quality can be easily provided.

It is preferred for the colloidal dispersion resin used in the ink composition according to the present invention to have a low viscosity even when the pH of the ink composition is on the alkaline side. Specific examples of such a colloidal dispersion resin include Watersol CD-520 (alkyd resin) and Watersol CD-530 and CD-540 (modified epoxy polyester resin) manufactured by Dainippon Ink and Chemicals, Inc., and Dispercoll KA8486, KA8481 and U42 (polyurethane resin) manufactured by Bayer.

These colloidal dispersion resins may be used alone or in the form of a mixture of two or more of them.

According to a preferred embodiment of the present invention, the acid value of the colloidal dispersion resin is in the range of from 5 to 100. When the acid value of the colloidal dispersion resin is in this range, the colloidal dispersion can be more stably present in the ink.

The colloidal dispersion resin content is preferably about 0.2 to 20% by weight, still preferably about 2 to 20% by weight, based on the ink composition.

According to a preferred embodiment of the present invention, the total content of the resin component of the colloidal dispersion resin and the following pigment is 5 to 30% by weight, preferably 10 to 25% by weight, based on the ink composition. The weight ratio of the pigment to the resin component is preferably in the range of from 1:0.25 to 1:10.

(Volatile Alkali Component)

A volatile alkali component is added to the ink composition of the present invention for the purpose of stabilizing the colloidal dispersion resin. The presence of the alkali component enables the colloidal dispersion resin to be stably present in a semi-dissolved state also in the ink composition. Since the ink image should be concentrated in the step of concentration on the intermediate transfer medium (which will be described later), the alkali component should be volatile. However, when the alkali component is a highly volatile substance (for example, ammonia), it evaporates within a nozzle to coagulate the ink composition, which is causative of the occurrence of clogging. For this reason, it is preferred to avoid the use of such a highly volatile substance. According to a preferred embodiment of the present invention, the alkali component has a boiling point higher than water.

Specific preferred examples of the volatile alkali component include alkanolamines, for examples, monoethanolamine, N,N-dimethylethanolamine, N,N-diethylethanolamine, diethanolamine, triethanolamine, N-n-butyldiethanolamine and triisopropanolamine. An alkanolamine can be added as both the volatile alkali component and the water-soluble organic solvent.

Although the amount of addition of the alkali component may be properly determined so far as the colloidal dispersion resin can be stabilized, it is preferably about 0.5 to 15% by weight, still preferably about 2 to 12% by weight, based on the ink composition.

(Water-Soluble organic Solvent)

The water-soluble organic solvent contained in the ink composition according to the present invention serves to prevent clogging of the nozzle through an improvement in the moisture retention and, at the same time, to improve the stability of the ink. Further, the water-soluble organic solvent accelerates the formation of a peeling layer which will be described later.

Preferred examples of the water-soluble organic solvent include polyhydric alcohols having a high boiling point and a low volatility such as glycerol, ethylene glycol, diethylene glycol, triethylene glycol, propylene glycol, dipropylene glycol, hexylene glycol, polyethylene glycol and polypropylene glycol. Further examples of the water-soluble organic solvent include monoetherification products, dietherification products and esterification products of the above-described polyhydric alcohols such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether. Further, it is also possible to use cellosolves such as methyl cellosolve and ethyl cellosolve, carbitols such as methyl carbitol and ethyl carbitol, morpholines, such as morpholine and N-ethylmorpholine, and pyrrolidones such as N-methyl-2-pyrrolidone.

Further, it is preferred for the ink composition of the present invention to further contain highly volatile monohydric alcohols such as ethanol, propanol and isopropanol, from the viewpoint of improving the quick drying and fixing or prints.

The water-soluble organic solvents may be used alone or in combination of two or more of them.

In the ink composition according to the present invention, when the water-soluble organic solvents are used alone, the solubility parameter (SP value) of the water-soluble organic solvent used is preferably 12 or more. On the other hand, when the water-soluble organic solvents are used in combination of two or more of them, the SP value of the mixed organic solvent is preferably 12 or more. The SP value of the mixed solvent can be determined by the following equation.

$$\delta_{mix} = \frac{X_1 V_1 \delta_1 + X_2 V_2 \delta_2 + X_3 V_3 \delta_3 + \ldots + X_n V_n \delta_n}{X_1 V_1 + X_2 V_2 + X_3 V_3 + \ldots + X_n V_n}$$

wherein $\delta$ represents an SP value of each solvent, x represents a molar fraction of each solvent in the mixed solvent, V represents a molar volume of each solvent and n is a subscript representing the kind of the solvent and an integer of 2 or more.

When the SP value of the water-soluble organic solvent is 12 or more, their "peeling layer" can be advantageously formed in an efficient manner. An expected mechanism through which the peeling layer is formed will be described later.

According to a preferred embodiment of the present invention, when the water-soluble organic solvent is a mixed solvent, the SP value of at least one water-soluble organic solvent is less than 12. When the SP value of at least one water-soluble organic solvent contained in the mixed solvent is less than 12, the ink image can be more efficiently transferred from the intermediate transfer medium to a recording medium.

According to another preferred embodiment of the present invention, when the water-soluble organic solvent is a mixed solvent, at least one solvent contained in the mixed solvent has a boiling point higher than water, that is, 100° C. or above. In this embodiment, the "peeling layer" can be efficiently formed.

The amount of addition of the water-soluble organic solvent is preferably about 0.5 to 30% by weight, still preferably 5 to 25% by weight, based on the ink composition.

(Colorant)

Examples of the pigment include organic pigments and inorganic pigments. Preferred specific examples of pigments for a black ink include carbon black (C.I. Pigment Black 7), such as furnace black, lamp black, acetylene black and channel black, metals, such as copper, iron (C.I. Pigment Black 11) and titanium oxide, and organic pigments, such as o-nitroaniline black (C.I. Pigment Black 1). Preferred specific examples of the pigment for a color ink include C.I. Pigment Yellow 1 (fast yellow G), 3 and 12 (disazo yellow AAA), 13, 14, 17, 24, 34, 35, 37 and 42 (iron oxide yellow), 53, 55, 81 and 83 (disazo yellow HR), 95, 97, 98, 100, 101, 104, 108, 109 110, 117, 120, 138 and 153, C.I. Pigment Orange 5, 13, 16, 17, 36, 43 and 51, C.I. Pigment Red 1, 2, 3, 5, 17 and 22 (brilliant fast scarlet), 23, 31, 38 and 48:1 (permanent red 2B(Ba)), 48:2 (permanent red 2B (Ca)), 48:3 (permanent red 2B (Sr), 48:4 (permanent red 2B (Mn)), 49:1, 52:2, 53:1 and 57:1 (brilliant carmine 6B), 60:1, 63:1, 63:2, 64:1 and 81 (rhodamine 6G lake), 83, 88 and 101 (iron oxide red), 104, 105, 106 and 108 (cadmium red), 112, 114 and 122 (quinacridone magenta), 123, 146, 149, 166, 168, 170, 172 177, 178, 179, 185, 190, 193, 209 and 219, C.I. Pigment Violet 1 (rhodamine Blake), 3, 5:1, 16 and 19 (quinacridone red), 23 and 38, C.I. Pigment Blue 1, 2 and 15 (phthalocyanine blue R), 15:1, 15:2 and 15:3 (phthalocyanine blue G) 15:4 and 15:6 (phthalocyanine blue E), 16 and 17:1, 27 (iron blue), 28 (cobalt blue), 29 (ultramarine blue), 56, 60 and 63, and C.I. Pigment Green 1, 4, 7, 8, 10, 17, 18 and 36. It is also possible to use, besides the above-described pigments, processed pigments such as graft carbon having a surface treated with a resin or the like.

The amount of addition of the pigment is preferably about 0.5 to 15% by weight. The particle diameter of the pigment is preferably 25 μm or less, particularly preferably 1 μm or less.

If necessary, the addition of a dispersant in an amount of 1 to 100% by weight based on the pigment followed by dispersing with a ball mill or the like may be effected for the purpose of homogeneously dispersing the pigment.

(Additives)

The ink composition of the present invention may further contain various additives.

For example, it is preferred to add at least one water-soluble anionic, amphoteric or nonionic surfactant to the ink composition of the present invention. The addition of the surfactant lowers the surface tension of the ink and when the surface of the intermediate transfer medium comprises, for example, a rubber material having a low surface tension, the surfactant improves the wettability of the rubber material by the ink to prevent the occurrence of repelling and flow of the ink on the transfer medium, thus enabling the ink image to be fixed. In particular, in the case of an intermediate transfer medium having a surface comprising a silicone rubber, a fluororubber or the like, although the ink image can be transferred to the recording medium under low pressure, the wettability of the intermediate transfer medium by the ink composition is often insufficient. In such a case, the addition of a surfactant to the ink composition is advantageous.

Preferred specific examples of the anionic surfactant include a salt of a higher fatty acid, a salt of a higher alkyldicarboxylic acid, a salt of a higher alcohol sulfuric acid ester, a salt of a higher alkylsulfonic acid, a salt of an alkylbenzenesulfonic acid, a salt of an alkylnaphthalenesulfonic acid, a condensate of a higher fatty acid with an amino acid, a salt of a dialkylsulfosuccinic acid ester, a salt of an alkylsulfosuccinic acid, a salt of naphthenic acid, a salt of an alkyl ether carboxylic acid, an acylated peptide, a salt of an α-olefinsulfonic acid, N-acylmethyltaurine, a salt of an alkylethersulfonic acid, a secondary higher alcohol ethoxysulfate, a salt of a polyoxyethylene alkylphenyl ether sulfonic acid, a monoglysulfate, a salt of an alkyl ether phosphoric acid ester and a salt of an alkylphosphoric acid ester.

Specific preferred examples of the amphoteric surfactant include a carboxybetaine type surfactant, a salt of aminocarboxylic acid and lecithin.

Specific preferred examples of the nonionic surfactant include a fluorine surfactant, a silicone surfactant, a copolymer of acrylic acid, polyoxyethylene alkyl ether, polyoxyethyene alkylphenyl ether, polyoxyethylene secondary alcohol ether, polyoxyethylene sterol ether, a lanolin derivative of polyoxyethylene, an ethylene oxide derivative of a formalin condensate of an alkylphenol, a polyoxyethylene/polyoxypropylene block polymer, a fatty acid ester of a polyoxyethylene polyoxypropylene alkyl ether polyoxyethylene compound, a polyethylene oxide condensation type polyethylene glycol fatty acid ester, a fatty acid monoglyceride, a polyglycerin fatty acid ester, a sorbitan fatty acid ester, a propylene glycol fatty acid ester, a sucrose fatty acid ester, a fatty acid alkanolamide, a polyoxyethylene fatty acid amide and polyoxyethylene alkylamine alkylamine oxide.

The amount of addition of these surfactants is preferably about 0.01 to 5% by weight, still preferably about 0.1 to 2% by weight, based on the ink composition.

In the ink composition of the present invention, if necessary, benzoic acid, dichlorophene, hexachlorophene, sorbic acid, a p-hydroxybenzoic acid ester, ethylenediaminetetraacetic acid (EDTA), sodium dehydroacetate, 1,2-benzothiazolin-3-one, 3,4-isothiazolin-3-one may be added as a fungicide, a preservative and a rust preventive. Further, urea, thiourea, ethyleneurea may be added for the purpose of preventing the nozzle from drying.

The viscosity of the ink composition of the present invention is preferably 50 mPa.sec or less, particularly preferably 25 mPa.sec or less, from the viewpoint of ensuring stable ejection of the ink from the nozzle and stable supply of the ink to the head.

(Production of Ink Composition)

The ink composition of the present invention can be produced, for example, by the following method.

At the outset, a pigment, together with a dispersant, is dispersed in water to prepare a pigment dispersion having a high pigment concentration. The concentration of the pigment in the pigment dispersion is preferably about 20%. The pigment dispersion is mixed with other ink components, and the mixture is stirred for several hours. Thereafter, coarse particles are removed with a sharpless or collector continuous centrifuge to provide an ink composition.

Recording Method

According to another aspect of the present invention, there is provided an intermediate transfer ink jet recording method using the ink composition of the present invention. The intermediate transfer ink jet recording method according to the present invention will now be described with reference to the accompanying drawings.

Figure 2:
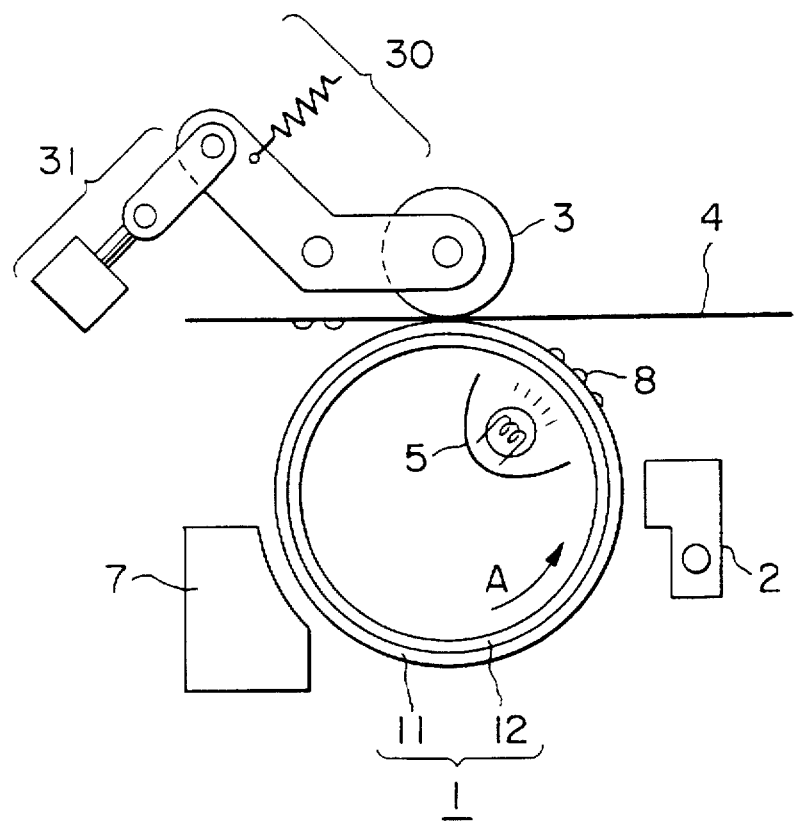
FIG. 2 is a cross-sectional view in the direction of X of the device shown in FIG. 1.

FIG. 1 is a perspective view of a device for practicing the recording method according to the present invention, and FIG. 2 is a cross-sectional view in the direction of X of the device shown in FIG. 1. This device comprises a transfer drum 1 as an intermediate transfer medium and, disposed around the transfer drum 1 from the upstream side in the direction of rotation of the transfer drum 1, ink jet recording means 2 and a pressure roller 3.

The transfer drum 1 comprises an elastic layer 11 constituting the surface of the drum 1 and an internal drum 12. A recording medium 4 is sandwiched and supported between the transfer drum 1 and the pressure roller 3, and carried with the rotation of the recording drum 1 and the pressure roller 3. The transfer drum 1 is heated by a heater 5 which is heating means provided inside the transfer drum 1. The heater 5 heats and concentrates the ink image on the surface of transfer drum 1 so that the ink image can be transferred in the following manner. The transfer in the following manner is herein often referred to as "interfacial transfer" with the ink image ready for the interfacial transfer being herein often referred to as an ink image brought to a "film form". The pressure roller 3 can press the recording medium 6 against the transfer drum 1 by taking advantage of the pressure applied by pressurizing means 30. If necessary, the pressing of the pressure roller 3 against the recording medium 6 can be released by pressure release means 31. Further, if necessary, cleaning means 7 for removing the residual ink or the like after transfer may be provided downstream of the pressure roller 3.

Figure 3A:
FIGS. 3a,b are schematic views of the form of an ink image formed on a transfer drum of the recording device according to the present invention, wherein FIG. 3(a) schematically shows the form of an ink image immediately after the formation thereof on the transfer drum and FIG. 3(b) schematically shows the form of an ink image brought to a film form on the transfer drum, together with a "peeling layer" formed between the ink image and the transfer drum.
Figure 3B:
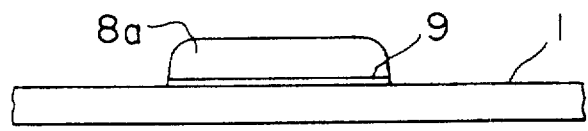

In the above-described device, printing is effected as follows. At the outset, recording means 2 (an ink jet recording head) ejects droplets of the ink composition onto the transfer drum 1 to form an ink image 8. The ink image 8 immediately after the formation thereof can take a form as shown in FIG. 3(a). The ink image 8 is heated on the transfer drum 1 by the heater 5. The heating causes the solvent to be evaporated from the ink image 8, that is, the ink image to be concentrated. This increases the solid component concentration, and finally an agglomerate consisting essentially of solid components alone is formed on the transfer drum 1. The concentrated agglomerate has cohesive force considered attributable to the colloidal dispersion resin contained in the ink. The cohesive force brings the ink image to an ink image 8a in a film form having a substantially homogeneous thickness as shown in FIG. 3(b). The surface of the ink image 8a is viscous in the heated state.

Figure 4:
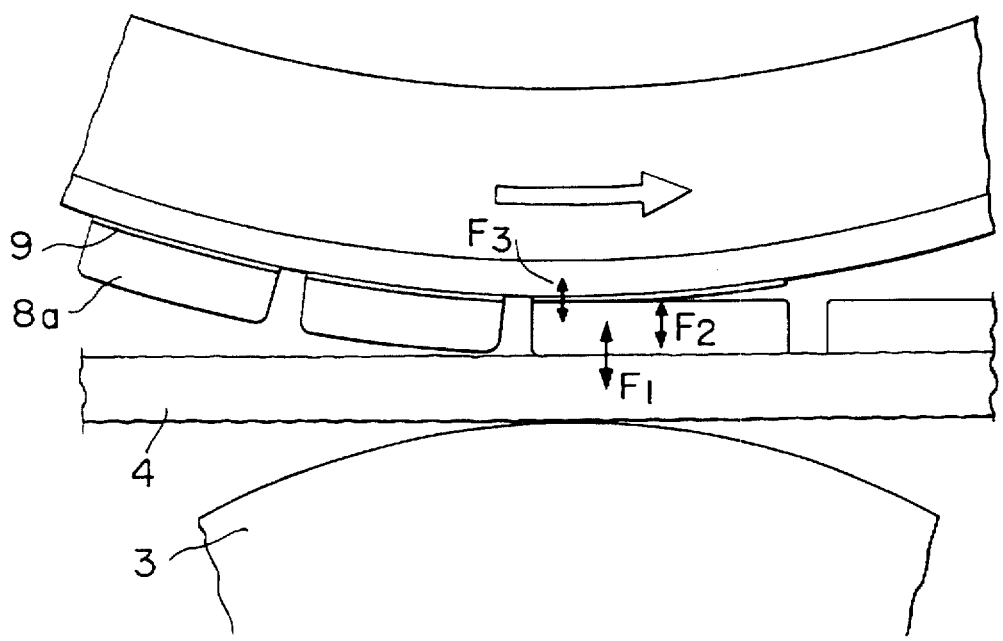
FIG. 4 is a schematic diagram showing the transfer of an ink image in the recording device according to the present invention.

Subsequently, the ink image 8a in the heated state is carried to a region facing the pressure roller 3 with the rotation of the transfer drum 1 and transferred to the recording medium 4 according to the "interfacial transfer" referred herein. This "interfacial transfer" will now be described in more detail with reference to FIG. 4. In this device, the transfer drum 1 is pressed through the recording medium 4 against the pressure roller 3. In the recording method according to the present invention, three forces, that is, an adhesive force (F1) between the ink image 8a and the recording medium 4, a cohesive force (F2) of the ink image 8a and an adhesive force (F3) between the ink image 8a and the surface of the transfer roller 1 have the relationship F1>F2>F3, so that one interface of the ink image 8a is wholly peeled off from the surface of the transfer drum 1 with the other interface of the ink image being wholly adhered to the recording medium 4.

In particular, the ink image of the ink composition of the present invention brought to a film form is advantageous because it has a rubber elasticity considered attributable to the colloidal dispersion resin and, when cooled, exhibits a very high fastness property.

In the present invention, it is also possible to realize a large force F1, which enables excellent transfer to be effected even when the pressure applied by the pressure roller 3 is low.

More interestingly, in the ink composition of the present invention, a layer 9 of a water-soluble organic solvent is formed between the ink image 8a and the transfer drum 1 with the formation of the ink image 8a. The expected mechanism through which the layer 9 is formed will be described later. The organic solvent layer 9 reduces F3, because the layer 9 prevents the ink image 8a from directly contacting with the drum 1. As the result, the ink image 8a is wholly and easily peeled off with no part of the ink image remained on the drum 1. Since the layer 9 is advantageous for peeling the ink image 8a from the transfer drum, the layer is herein often referred to as a "peeling layer".

The mechanism through which the "peeling layer" is formed is believed to be as follows, although the mechanism is not bound by the following theory. Although the solid component (i.e., composed mainly of a colorant and a resin component) contained in the ink composition has a high hydrophobicity, the solid component and the water-soluble organic solvent are stably present in the system so far as water is present. When water becomes absent, since the solid component is highly hydrophobic with the water-soluble organic solvent being hydrophilic, the two components become uncompatible with each other, which leads to a phase separation. Therefore, in the recording method according to the present invention, when the ink image is heated to form an agglomerate of the solid component, the water-soluble organic solvent subjected to phase separation from the solid component bleeds out on the agglomerate, especially between the intermediate transfer medium and the agglomerate. The layer thus formed is considered to be a peeling layer. Accordingly, a combination of a solid component having a high hydrophobicity and a water-soluble organic solvent having a high hydrophilicity and a high boiling point (i.e., less liable to evaporate) is advantageous to efficient formation of the peeling layer. Specifically, as described above, the SP value of the water-soluble organic solvent is preferably 12 or more. Further, since it is preferred for the water-soluble organic solvent to exist as the peeling layer even after the water contained in the ink image is evaporated, the boiling point of the water-soluble organic solvent is preferably higher than that of water, that is, above 100° C.

A further advantage of the present invention is that a thickness of about 2 to 10 μm suffices as the thickness of the ink image brought to a film form on the transfer drum for finally obtaining a sufficient image density (for example, 1.4 or more in terms of the OD value) on the recording medium 4. Specifically, in the case of the conventional intermediate transfer ink jet recording method, the pressure applied in the transfer of the ink image to the recording medium is so high that the ink image is unfavorably deformed ("defaced"), which is causative of the deterioration in the quality of the image. By contrast, in the present invention, the thickness of the ink image on the transfer drum 1 is about 2 to 10 μm, that is, sufficiently smaller than 120 μm, which is the diameter of one dot as the minimum pixel in 300 dpi recording. Therefore, the present invention is advantageous also in that the deformation of the ink image is so small that no defacing of the image is observed in the transfer of the image to the recording medium.

In the recording method according to the present invention, an excellent transfer can be provided independently of the kind of the recording medium, more specifically, independently of the surface profile of the recording paper. Specifically, since the ink image 8a brought to a film form has a given cohesive force F2, the ink image 8a is transferred in one onto the recording medium 4. Even though the recording medium is significantly uneven (for example, bond paper) when the ink image 8a is adhered to the recording medium with a sufficient adhesive force attained through the contact of the ink image 8a with protrusions of the recording medium, the ink image 8a is transferred while maintaining the form. Therefore, no deficiency of the image attributable to the uneven surface of the recording medium occurs, and good transfer can be provided.

Thereafter, the ink image 8a transferred to the recording medium 4 is subjected to removal of the heat for solidification. Even after the solidification, the adhesive force F1 of the ink image 8a remains still large, so that a good fixation of the ink image can be provided.

The term "ink image" used herein is intended to mean both an image consisting of one dot as the minimum pixel alone and an image comprising a gathering of a plurality of dots adjacent and connected to each other.

The device suitable for practicing the recording method according to the present invention will be further described.

The elastic layer 11 of the transfer drum 1 preferably comprises a rubber material and particularly preferably a rubber material that can facilitate the peeling of the ink image therefrom and is heat-resistant. Preferred examples of the rubber material include a chloroprene rubber, a nitrile rubber, an ethylene-propylene rubber, a silicone rubber, a fluorosilicone rubber, a fluororubber, a natural rubber, a styrene rubber, an isoprene rubbber, a butadiene rubber, an ethylene/propylene/butadiene polymer and a nitrile-butadiene rubber. A silicone rubber, a fluorosilicone rubber and a fluororubber are preferred from the viewpoint of the heat resistance.

As described above, the ink ejected as ink droplets forms an ink image 8 on the transfer drum 1. In this case, if the ink image 8 is repelled or flows on the transfer drum, no desired ink image (for example, having a desired dot diameter) can be provided. In order to prevent this unfavorable phenomenon, it is preferred to use an ink composition adjusted to have a suitable capability of wetting the surface of the transfer drum by adding a surfactant.

The formation of the image on the transfer drum 1 is effected with the ink jet recording means 2. Examples of the recording means 2 include an ink jet recording head using a piezoelectric element.

Figure 5A:
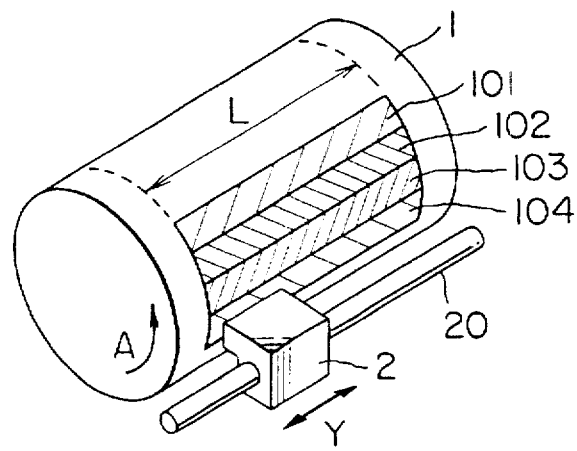

The formation of an image on the transfer drum 1 with this recording head 2 can be effected by various methods. The formation of an image with the transfer drum 1 and the recording head 2 shown in FIG. 1 will now be described as an example with reference to FIG. 5. In the device shown in FIG. 5(a), scanning is effected in the direction of arrow Y along a carriage shaft 20 parallel to the shaft of the transfer drum 1. While the recording head 2 reciprocates along the carriage shaft, it effects printing during a period of time when it is in a printing region L with the printing being suspended during a period of time when the recording head 2 is outside the region L. The transfer drum 1 is stopped when the recording head 2 is in the region L. The rotation of the transfer drum 1 is suspended when the recording head is in the region L. On the other hand, the transfer drum 1 is rotated in the direction of A shown in the drawing at a given angle when it is outside the region L. The repetition of the reciprocated scanning of the recording head with the intermittent rotation of the transfer drum 1 causes a region having an image formed on the transfer drum 1 to be increased as a striped region. As shown FIG. 5(a), striped regions 101, 102, 103 and 104 are successively formed.

Figure 5B:
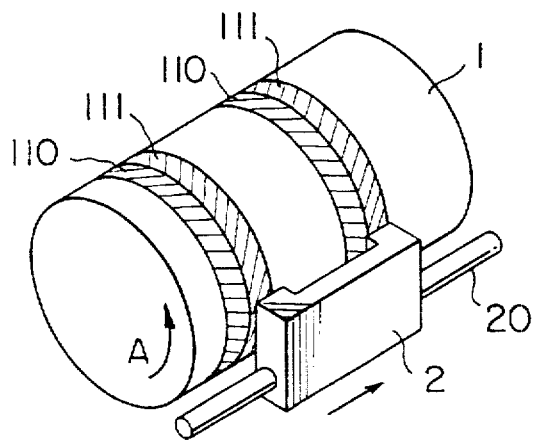

In a device shown in FIG. 5(b), the recording head 2 is moved at a given rate along the carriage shaft 20 parallel to the shaft of the transfer drum 1 while rotating the transfer drum 1 at a given rate. As a result, regions 110, 111 printed on the transfer drum 1 are increased in a spiral form. In this device, the recording head 2 has two ink jet recording heads.

Figure 5C:
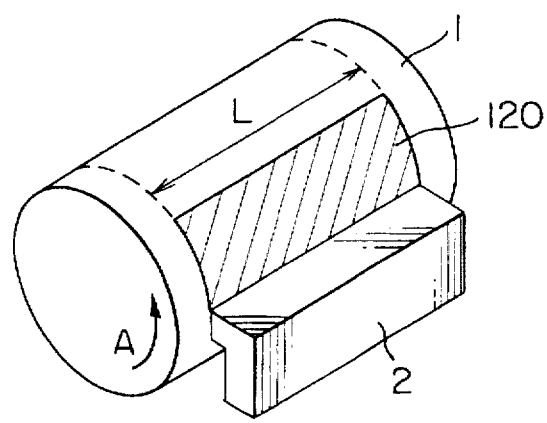

In a device shown in FIG. 5(c), a recording head 2 all over the printing region L is used. In this device, the recording head 2 is fixed with the transfer drum 1 being rotated at a given rate, which causes a printing region 120 to be continuously increased in the circumferential direction of the transfer drum.

Among the above-described image forming methods, when the device shown in FIG. 5(b) is employed, the transfer of the ink image onto the recording medium should be effected after the formation of one page of an ink image on the transfer drum 1. On the other hand, when devices shown in FIGS. 5(a) and (c) are employed, the transfer of the ink image onto the recording medium may be effected after the formation of one page of an ink image on the transfer drum 1, provided that the circumferential length of the transfer drum 1 is sufficient to record one page of ink image, or alternatively may be effected in the course of the formation of one page of the ink image. For example, when use is made of a device shown in FIG. 5(a), that is, a device shown in FIG. 1, the pressure roller 3 remains separated from the transfer drum 1 by the pressure release means 31 (the recording medium 4 as well remaining uncarried yet) until one page of the ink image is formed on the transfer drum 1. After one page of the ink image is formed on the transfer drum 1 and the ink image is brought to a film form by heating, the pressure roller 3 is pressed against the transfer drum 1 by the pressurizing means 30. At the same time, the recording medium 4 is carried to transfer the ink image onto the recording medium 4. On the other hand, when the transfer of the ink image to the recording medium is effected in the course of the formation of one page of the ink image on the transfer drum, the pressure roller 3 is previously pressed against the transfer drum 1 by the pressurizing means 30. The ink image brought to a film form by heating is continuously transferred to the recording medium 4 without waiting for the completion of formation of one page of the ink image.

The heater 5 heats and concentrates the ink image on the surface of the transfer drum 1 so that the ink image brought to a film form can be formed. Although the heating temperature may be arbitrarily determined by taking the recording conditions such as the above-described ink image forming method into consideration, it is preferably below 50° C., still preferably in the range of from 40° to 50° C. When the heating temperature exceeds 50° C., the heating and concentration of the ink image often cause even a water-soluble organic solvent for forming the peeling layer to be unfavorably evaporated.

Although specific heating means may be arbitrarily selected, preferred examples of the heating means include a combination of a heater lamp with a reflecting mirror.

Figure 6A:
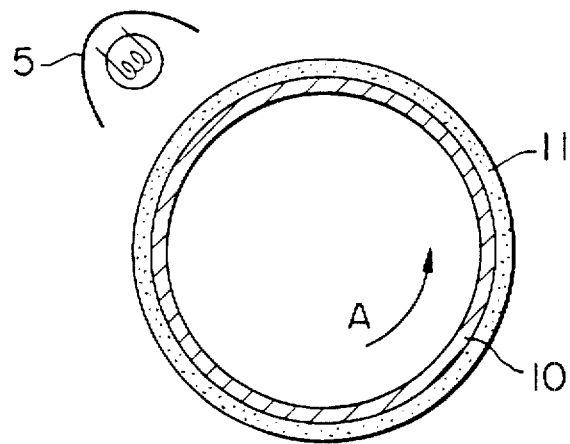

As shown in FIG. 6(a), the heater 5 may be provided outside the transfer drum 1 rather than inside the transfer drum 1. This embodiment is advantageous in that the ink image alone can be directly heated, and the conduction of heat to other places than the ink image, for example, recording head 2, can be reduced. Further, It is advantageous also in that a warm up time taken for attaining a desired temperature in the transfer drum 1 can be shortened.

Figure 6B:
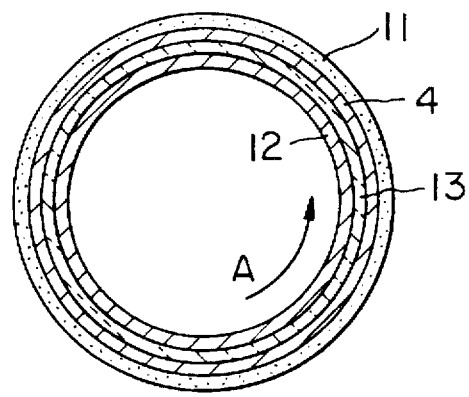

As shown in FIG. 6(b), the transfer drum 1 may be integral with the heating element. In this embodiment, a heat insulating layer 13 is provided on the internal drum 12. A heater layer 15 (for example, a ceramic heater) is further provided thereon. The elastic layer 11 is provided on the heater layer 15. The surface of the transfer drum is heated by the heater layer 15.

Figure 7:
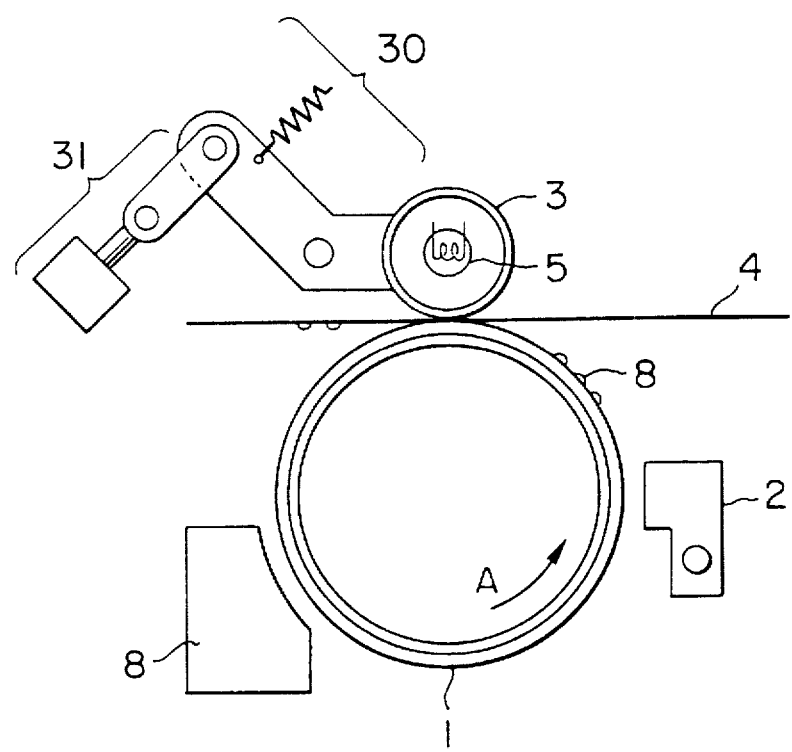
FIG. 7 is a device for practicing the ink jet recording method according to the present invention wherein a heater and a pressure roller are integrally constructed.

According to a preferred embodiment of the present invention, as shown in FIG. 7, the heater 5 is constructed integrally with the pressure roller 3. In this device, heating means 5 (for example, a heater) is provided inside the pressure roller 3. In this device, printing is effected as follows. The pressure roller 3 is first provided somewhat apart from the transfer drum 1 by the pressure release means 31. In this case, the transfer drum 1 is heated to a desired temperature by the heater 5 provided inside the pressure roller 3. The ink image 8 formed by the recording head 2 is heated and brought to a film form by the heater 5. Thereafter, the pressure roller 3 is pressed against the transfer drum 1 by the pressurizing means 30. At the same time, the recording medium 4 is carried to transfer the ink image to the recording medium. Alternatively, from the first, the pressure roller 3 may be pressed against the transfer drum 1 to heat the transfer drum 1. Then, a series of procedures comprising the formation of an ink image, the conversion of the ink image to a film form an the transfer of the ink image in a film form to the recording medium may be effected in a continuous manner. More interestingly, in the device shown in FIG. 7, it is possible to simultaneously effect the convention of the ink image to a film form and the transfer of the ink image to the recording medium by properly setting conditions, such as the temperature of the heater 5 and the number of revolutions of the transfer drum 1. Specifically, heating is effected while pressing the ink image formed on the transfer drum by the recording head 2 between the pressure roller 3 and the transfer drum 1 against the recording medium 4 to simultaneously effect the conversion of the ink image and the transfer of the ink image to the recording medium.

In the recording method according to the present invention, the ink image on the transfer drum can be successfully effected at a low pressure of about 1.0 kg/cm or less, preferably about 1.0 to 0.3 kg/cm.

The present invention will now be described in more detail with reference to the following Examples, though it is not limited to there Examples only. In the Examples, "%" is % by weight unless otherwise specified.

| Example A1 | |
|---|---|
| MA-100 (carbon black manufactured by Mitsubishi Kasei Corp.) 20% water dispersion* | 15.0% |
| Watersol CD-540 (modified epoxy ester colloidal dispersion manufactured by Dainippon Ink and Chemicals, Inc.,; resin content = 40% (solid basis), isopropylene glycol content = 13%) | 30.0% |

| Example A1 -continued | |
|---|---|
| Triethylene glycol | 5.0% |
| Triethanolamine | 5.0% |
| Sodium dehydroacetate | 0.1% |
| Pure water | 44.9% |
| | 100.0% |

*A pigment was added to pure water (containing sodium dioctylsulfosuccinate as a dispersant in an amount of 0.001% based on the pigment) and dispersed with an Eiger mill until the average particle diameter of the pigment became 0.5 μm.

After the above components were mixed with each other and stirred for 3 hr, coarse particles were removed with a sharpless continuous centrifuge to provide an ink composition.

| Example A2 | |
|---|---|
| C.I. Pigment Red 57:1 20% water dispersion* | 10.0% |
| Watersol CD-530 (modified epoxy ester colloidal) dispersion manufactured by Dainippon Ink and Chemicals, Inc.; resin content = 40% (solid basis), butyl cellosolve + ethyl cellosolve content = 13%) | 50.0% |
| Diethylene glycol | 2.0% |
| Diethanolamine | 12.0% |
| Sodium dehydroacetate | 0.1% |
| Pure water | 25.9% |
| | 100.0% |

*The water dispersion was prepared in the same manner as that of Example A1, except that the final average particle diameter was 0.7 μm.

After the above components were mixed with each other and stirred for 3 hr, coarse particles were removed with a sharpless continuous centrifuge to provide a magenta ink composition.

| Example A3 | |
|---|---|
| C.I. Pigment Blue 15:3 20% water dispersion* | 30.0% |
| Watersol CD-520 (alkyd colloidal dispersion manufactured by Dainippon Ink and Chemicals, Inc.; resin content = 40% (solid basis), isopropylene glycol content = 18%) | 20.0% |
| N-n-Butyldiethanolamine | 7.0% |
| Sodium dehydroacetate | 0.1% |
| Pure water | 42.9% |
| | 100.0% |

*The water dispersion was prepared in the same manner as that of Example A1, except that the final average particle diameter was 0.6 μm.

After the above components were mixed with each other and stirred for 3 hr, coarse particles were removed with a sharpless continuous centrifuge to provide a cyan ink composition.

| Example A4 | |
|---|---|
| C.I. Pigment Yellow 12 20% water dispersion* | 40.0% |
| Dispercoll KA8464 (Polyurethane colloidal dispersion manufactured by Bayer; resin content = | 10.0% |

-continued

| Example A4 | |
|---|---|
| 40% (solid basis)) | |
| Triisopropanolamine | 2.0% |
| Ethylene glycol | 4.0% |
| Sodium dehydroacetate | 0.1% |
| Pure water | 43.9% |
| | 100.0% |

*The water dispersion was prepared in the same manner as that of Example A1, except that the final average particle diameter was 0.4 µm.

After the above components were mixed with each other and stirred for 3 hr. coarse particles were removed with a sharpless continuous centrifuge to provide a yellow ink composition.

COMPARATIVE EXAMPLE A1

A black ink was prepared in the same manner as that of Example A1, except that a 40% aqueous solution of polyvinyl pyrrolidone K30 was used instead of Watersol CD-540.

COMPARATIVE EXAMPLE A2

A magenta ink composition was prepared in the same manner as that of Example A2, except that Primal AC-22 (acrylic resin emulsion manufactured by Japan Acrylic Chemical Co., Ltd.; resin content=44.5% (solid basis)) was used instead of Watersol CD-530.

COMPARATIVE EXAMPLE A3

A cyan ink composition was prepared in the same manner as that of Example A3, except that sodium polyacrylate (25% aqueous solution) was added in an amount of 32.0% instead of Watersol CD-520 and the amount of pure water was 30.9%.

COMPARATIVE EXAMPLE A4

A yellow ink composition was prepared in the same manner as that of Example A4, except that the amount of Dispercoll KA8464 was changed to 2.5% and the amount of pure water was increased.

Evaluation A

The ink compositions provided in Examples A1 to A4 and Comparative Examples A1 to A4 were evaluated as follows.

Evaluation A1: Storage Stability

The ink composition was sealed into a glass container, allowed to stand at −20° C. or at 60° C. for 7 days and then allowed to stand at room temperature for one month. Thereafter, the state of dispersion of pigment particles in the ink composition was observed under a microscope.

Evaluation A2: Clogging

The ink composition was filled into an ink jet recording device provided with an ink jet recording head having a jet nozzle diameter of 50 µm and a driving frequency of 6 kHz. After printing was interrupted, the device was allowed to stand at 40° C. for 3 days and printing was then resumed. The state of delivery of the ink at that time was observed.

Evaluation A3: Jetting Stability

The ink composition was filled into the ink jet recording device used in Evaluation A2, and printing was continuously effected at room temperature for 12 hr.

Evaluation A4: Water Resistance and Rubbing Resistance of Print

The ink composition was filled into the ink jet recording device used in Evaluation A2, and printing was then effected. The printed face was rubbed with a wetted cotton cloth under a pressure of 300 g/cm to determine whether or not a stain occurred.

Evaluation A5: Folding Resistance

Printing was effected in the same manner as that used in Evaluation A4, and the print was folded at 180° to determine whether or not cracking or peeling of the print occurred.

Evaluation A6: Adaptability to Intermediate Transfer Ink Jet Recording Method

Printing was effected on Xerox 4024 paper with an intermediate transfer ink jet recording device shown in FIG. 1. In this case, the intermediate transfer drum was provided with an elastic layer of a hydrogenated nitrile rubber, and the writing system was the same as that shown in FIG. 5(a). The temperature of the intermediate transfer drum was 50° C., and the transfer pressure was 1 kg/cm².

Results

In all Evaluations A1 to A4, the ink compositions of Examples A1 to A4 provided good results.

On the other hand, the ink composition of Comparative Example A1 exhibited a remarkable stain on the printed face in Evaluation A4, and gave rise to cracking of the print in Evaluation A5. The ink composition of Comparative Example A2 gave rise to clogging of a nozzle in Evaluation A2, and, in Evaluation A3, went off the track of jetted ink droplets in some nozzles after the elapse of 6 hr. The ink composition of Comparative Example A3 exhibited a remarkable stain on the print in Evaluation A4, and gave rise to peeling of the print in Evaluation A5. The ink Composition of Comparative Example A4 exhibited a remarkable stain on the print in Evaluation A4.

With respect to Evaluation A6, the print was observed with the naked eye. As a result, in all the ink compositions of Examples A1 to A4, the print edge was clear, and no blurring occurred. Further no residual ink image was observed on the intermediate transfer drum. For the ink compositions of Comparative Examples A1 to A4, although printing could be effected, a considerable amount of residual ink image was observed on the intermediate transfer drum.

| Example B1 | |
|---|---|
| MA-100 | 15.0% |
| (carbon black manufactured by Mitsubishi Kasei Corp.) 20% water dispersion* | |
| Watersol CD-540 | 30.0% |
| (modified epoxy ester colloidal dispersion manufactured by Dainippon Ink and Chemicals, Inc.; resin content = 40% (solid basis), isopropylene glycol content = 13%) | |
| Triethylene glycol | 5.0% |
| Triethanolamine | 5.0% |
| Sodium dioctylsulfosuccinate | 1.0% |
| Fluorad FC-170C (perfluoroalkyl polyoxyethylene ethanol manufactured by Sumitomo 3M Ltd.) | 1.0% |
| Sodium dehydroacetate | 0.1% |
| Pure water | 42.9% |
| | 100.0% |

*A pigment was added to purified water (containing sodium dioctylsulfosuccinate as a dispersant in an amount of 0.001% based on the pigment) and dispersed with an Eiger mill until the average particle diameter of the pigment became 0.5 µm.

After the above components were mixed with each other and stirred for 3 hr, coarse particles were removed with a collector continuous centrifuge to provide a black ink composition. Printing was effected using this ink on Xerox 4024 paper with an intermediate transfer ink jet recording device shown in FIG. 1. In this case, the intermediate transfer drum was provided with an elastic layer of a fluorosilicone rubber, and the writing system was the same as that shown in FIG. 5(a). The temperature of the intermediate transfer drum was 50° C., and the transfer pressure was 0.8 kg/.cm.

| Example B2 | |
|---|---|
| C.I. Pigment Red 57:1 | 10.0% |
| 20% water dispersion* | |
| Watersol CD-530 | 50.0% |
| (modified epoxy ester colloidal dispersion manufactured by Dainippon Ink and Chemicals, Inc.; resin content = 40% (solid basis), butyl cellosolve + ethyl cellosolve content = 15%) | |
| Diethylene glycol | 2.0% |
| Diethanolamine | 12.0% |
| Sodium dioctylsulfosuccinate | 0.3% |
| Silwet L-7604 (silicone surfactant manufactured by Nippon Unicar Co., Ltd.) | 0.7% |
| Sodium dehydroacetate | 0.1% |
| Purified water | 24.9% |
| | 100.0% |

*The water dispersion was prepared in the same manner as that of Example B1, except that the final average particle diameter was 0.7 μm.

After the above components were mixed with each other and stirred for 3 hr, coarse particles were removed with a collector continuous centrifuge to provide a magenta ink composition. Printing was effected using this ink on Xerox 4024 paper with an intermediate transfer ink jet recording device shown in FIG. 8. In this case, the intermediate transfer drum was provided with an elastic layer of a silicone rubber, and the writing system was the same as that shown in FIG. 5(b). The temperature of the intermediate transfer drum was 45° C., and the transfer pressure was 0.8 Kg/cm².

| Example B3 | |
|---|---|
| C.I. Pigment Blue 15:3 | 30.0% |
| 20% water dispersion* | |
| Watersol CD-520 | 20.0% |
| (alkyd colloidal dispersion manufactured by Dainippon Ink and Chemicals, Inc.; resin content = 40% (solid basis), isopropylene glycol content = 18%) | |
| N-n-Butyldiethanolamine | 7.0% |
| Hexaglyn 1-L (hexaglyceryl monolaurate manufactured by-Nikko Chemical Co., Ltd.) | 0.8% |
| Fluorad FC-170C | 0.4% |
| 1,2-Benzothiazolin-3-one | 0.1% |
| Pure water | 41.7% |
| | 100.0% |

*The water dispersion was prepared in the same manner as that of Example B1, except that the final average particle diameter was 0.6 μm.

After the above components were mixed with each other and stirred for 3 hr, coarse particles were removed with a collector continuous centrifuge to provide a cyan ink composition. Printing was effected using this ink on Xerox 4024 paper with an intermediate transfer ink jet recording device shown in FIG. 8. In this case, the intermediate transfer drum was provided with an elastic layer of a fluororubber, and the writing system was the same as that shown in FIG. 5(c). The temperature of the intermediate transfer drum was 45° C., and the transfer pressure was 0.8 kg/cm.

| Example B4 | |
|---|---|
| C.I. Pigment Yellow 12 | 40.0% |
| 20% water dispersion* | |
| Dispercoll KA8464 | 10.0% |
| (Polyurethane colloidal dispersion manufactured by Bayer; resin content = 40% (solid basis)) | |
| Triisopropanolamine | 2.0% |
| Ethylene glycol | 4.0% |
| Sorgen TW-60 (polyoxyethylene sorbitan monostearate manufactured by Dai-ichi Kogyo Seiyaku Co., Ltd. | 0.7% |
| Fluorad FC-430 (fluorinated alkyl ester manufactured by Sumitomo 3M Ltd.) | 0.5% |
| 3,4-Isothiazolin-3-one | 0.1% |
| Pure water | 42.7% |
| | 100.0% |

*The water dispersion was prepared in the same manner as that of Example B1, except that the final average particle diameter was 0.4 μm.

After the above components were mixed with each other and stirred for 3 hr, coarse particles were removed with a collector continuous centrifuge to provide a yellow ink composition. Printing was effected using this ink on Xerox 4024 paper with an intermediate transfer ink jet recording device shown in FIG. 1. In this case, the intermediate transfer drum was provided with an elastic layer of a silicone rubber, and the writing system was the same as that shown in FIG. 5(c). The temperature of the intermediate transfer drum was 45° C., and the transfer pressure was 0.8 kg/cm.

Evaluation B

The prints were observed with the naked eye. As a result, in all the prints for Examples B1 to B4, the print edge was clear, and no blurring occurred. Further, the whole ink image could be transferred from the intermediate transfer drum to the recording paper, and no residual ink image was observed on the intermediate transfer drum.

The density of the print was measured with a Macbeth densitometer. As a result, it was found that the OD value was excellent, that is, 1.45 for Example B1, 1.48 for Example B2, 1.46 for Example B3 and 1.47 for Example B4.

The printed face of the paper was rubbed with a wetted cotton cloth under a pressure of 300 g/cm. As a result, no stain of -the print was observed.

| Example C1 | |
|---|---|
| MA-100 | 15.0% |
| (carbon black manufactured by Mitsubishi Kasei Corp.) | |
| 20% water dispersion* | |
| Water CD-540 | 30.0% |
| (modified epoxy ester colloidal dispersion manufactured by Dainippon Ink and Chemicals, Inc.; resin content = 40% (solid basis), isopropoxy ethanol content = 13%) | |
| Ethylene glycol (SP value = 14.6, b.p. = 198° C.) | 20.0% |
| Triethanolamine | 5.0% |
| Sodium dioctylsulfosuccinate | 0.1% |

Example C1 -continued

| | |
|---|---|
| Sodium dehydroacetate | 0.1% |
| Pure water | 29.8% |
| | 100.0% |

*A pigment was added to purified water (containing sodium dioctylsulfosuccinate as a dispersant in amount of 0.001% based on the pigment) and dispersed with an Eiger mill until the average particle diameter of the pigment became 0.5 μm.

After the above components were mixed with each other and stirred for 3 hr, coarse particles were removed with a collector continuous centrifuge to provide a black ink composition. Printing was effected using this ink on Xerox 4024 paper with an intermediate transfer ink jet recording device shown in FIG. 1. In this case, the intermediate transfer drum was provided with an elastic layer of a hydrogenated nitrile-butyl rubber. The temperature of the intermediate transfer drum was 40° C., and the transfer pressure was 0.6 kg/.cm.

Example C2

| | |
|---|---|
| C.I. Pigment Red 57:1 20% water dispersion* | 15.0% |
| Watersol CD-530 (modified epoxy ester colloidal dispersion manufactured by Dainippon Ink and Chemicals, Inc.; resin content = 40% (solid basis), butyl cellosolve + ethyl cellosolve content = 13%) | 25.0% |
| Diethylene glycol (SP value = 12.1, b.p. = 245° C.) | 15.0% |
| Diethanolamine | 5.0% |
| Sodium dioctylsulfosuccinate | 0.1% |
| Sodium dehydroacetate | 0.1% |
| Pure water | 39.8% |
| | 100.0% |

*The water dispersion was prepared in the same manner as that of Example C1, except that the final average particle diameter was 0.7 μm.

After the above components were mixed with each other and stirred for 3 hr, coarse particles were removed with a collector continuous centrifuge to provide a magenta ink composition. Printing was effected using this ink on Xerox 4024 paper with an intermediate transfer ink jet recording device shown in FIG. 1. In this case, the intermediate transfer drum was provided with an elastic layer of a chloroprene rubber. The temperature of the intermediate transfer drum was 50° C., and the transfer pressure was 0.6 Kg/cm.

Example C3

| | |
|---|---|
| C.I. Pigment Blue 15:3 20% water dispersion* | 30.0% |
| Watersol CD-520 (alkyd colloidal dispersion manufactured by Dainippon Ink and Chemicals, Inc.; resin content = 40% (solid basis), 2-isopropoxy ethanol content = 18%) | 20.0% |
| Propylene glycol (SP value = 12.6, b.p. = 188° C.) | 15.0% |
| Triethanolamine | 5.0% |
| Hexaglyn 1-L (hexaglyceryl monolaurate manufactured by Nikko Chemical Co., Ltd.) | 0.2% |

Example C3 -continued

| | |
|---|---|
| 1,2-Benzothiazolin-3-one | 0.1% |
| Pure water | 29.7% |
| | 100.0% |

*The water dispersion was prepared in the same manner as that of Example C1, except that the final average particle diameter was 0.6 μm.

After the above components were mixed with each other and stirred for 3 hr, coarse particles were removed with a collector continuous centrifuge to provide a cyan ink composition. Printing was effected using this ink on Xerox 4024 paper with an intermediate transfer ink jet recording device shown in FIG. 1. In this case, the intermediate transfer drum was provided with an elastic layer of a fluororubber. The temperature of the intermediate transfer drum was 45° C., and the transfer pressure was 0.6 kg/cm.

Example C4

| | |
|---|---|
| C.I. Pigment Yellow 12 20% water dispersion* | 40.0% |
| Dispercoll KA8464 (Polyurethane colloidal dispersion manufactured by Bayer; resin content = 40% (solid basis)) | 15.0% |
| Triisopropanolamine | 2.0% |
| Glycerin (SP value = 16.5, b.p. = 290° C.) | 10.0% |
| Sorgen TW-60 (polyoxyethylene sorbitan monostearate manufactured by Dai-ichi Kogyo Seiyaku Co., Ltd. | 0.1% |
| 3,4-Isothiazolin-3-one | 0.1% |
| Pure water | 32.8% |
| | 100.0% |

*The water dispersion was prepared in the same manner as that of Example C1, except that the final average particle diameter was 0.4 μm.

After the above components were mixed with each other and stirred for 3 hr, coarse particles were removed with a collector continuous centrifuge to provide a yellow ink composition. Printing was effected using this ink on Xerox 4024 paper with an intermediate transfer ink jet recording device shown in FIG. 1. In this case, the intermediate transfer drum was provided with an elastic layer of a nitrile-butyl rubber. The temperature of the intermediate transfer drum was 45° C., and the transfer pressure was 0.6 kg/cm.

Example C5

| | |
|---|---|
| MA-100 (carbon black manufactured by Mitsubishi Kasei Corp.) 20% water dispersion* | 15.0% |
| Dispercoll KA8481 (polyurethane colloidal dispersion manufactured by Bayer; resin content = 40% (solid basis)) | 30.0% |
| Ethylene glycol (SP value = 14.6, b.p. = 198° C.) | 10.0% |
| Diethylene glycol (SP value = 12.1, b.p. = 245° C.) | 10.0% |
| Triethanolamine | 5.0% |
| OTP-100 (sodium di-2-ethylhexyl-sulfosuccinate manufactured by Nikko Chemicals Co., Ltd.) | 0.1% |
| Sodium dehydroacetate | 0.1% |

-continued

| Example C5 | |
|---|---|
| Pure water | 29.8% |
| | 100.0% |

*The water dispersion was prepared in the same manner as that of Example C1, except that the final average particle diameter was 0.5 μm.

After the above components were mixed with each other and stirred for 3 hr, coarse particles were removed with a collector continuous centrifuge to provide a black ink composition. Printing was effected using this ink on Xerox 4024 paper with an intermediate transfer ink jet recording device shown in FIG. 1. In this case, the intermediate transfer drum was provided with an elastic layer of a styrene-butadiene rubber. The temperature of the intermediate transfer drum was 45° C., and the transfer pressure was 0.6 kg/cm.

EXAMPLE C6

An ink composition was provided according to the same formulation as that of Example C1, except that ethylene glycol monomethyl ether (SP value=11.4, b.p.=125° C.) was used instead of ethylene glycol. A printing test was effected in the same manner as that of Example C1.

EXAMPLE C7

An ink composition was provided according to the same formulation as that of Example C2, except that diethylene glycol monomethyl ether (SP value=9.5, b.p.=230° C.) was used instead of diethylene glycol. A printing test was effected in the same manner as that of Example C2.

EXAMPLE C8

An ink composition was provided according to the same formulation as that of Example C3, except that dipropylene glycol (SP value=10.0, b.p.=232° C.) was used instead of ethylene glycol. A printing test was effected in the same manner as that of Example C3.

COMPARATIVE EXAMPLE C1

A printing test was effected using the ink of Example C4 in the same manner as that of Example C4, except that the temperature of the transfer drum was 80° C.

Evaluation C

The prints were observed with the naked eye. As a result, in all the prints for Examples C1 to C5, the print edge was clear, and no blurring occurred.

Further, the whole ink image could be transferred from the intermediate transfer drum to the recording paper, and no residual ink image was observed on the intermediate transfer drum.

The density of the print was measured with a Macbeth densitometer. As a result, it was found that the OD value was excellent, that is, 1.53 for Example C1, 1.45 for Example C2, 1.47 for Example C3, 1.44 for Example C4 and 1.15 for Example .5.

The printed face was rubbed with a wetted cotton cloth under a pressure of 300 g/cm². As a result, no stain of the print was observed.

On the other hand, for Examples C6 to C8 and Comparative Example C1, a part of the ink image remained on the intermediate transfer drum, so that no good print could be provided. However, 1 kg/cm of the transfer pressure provided excellent printings except Comparative Example C1.

| Example D1 | |
|---|---|
| MA-100 | 15.0% |
| (carbon black manufactured by Mitsubishi Kasei Corp.) 20% water dispersion* | |
| Watersol CD-540 | 30.0% |
| (modified epoxy ester colloidal dispersion manufactured by Dainippon Ink and Chemicals, Inc.; resin content = 40% (solid basis), isopropoxy ethanol content = 13%) | |
| Ethylene glycol (SP value = 14.6, b.p. = 198° C.) | 15.0% |
| Triethylene glycol (SP value = 10.7, b.p. = 288° C.) | 5.0% |
| (When the above solvents are mixed with each other, the SP value of the resultant mixed solvent is 12.7) | |
| Triethanolamine | 5.0% |
| Sodium dioctylsulfosuccinate | 0.1% |
| Sodium dehydroacetate | 0.1% |
| Pure water | 29.8% |
| | 100.0% |

*A pigment was added to purified water (containing sodium dioctylsulfosuccinate as a dispersant in an amount of 0.001% based on the pigment) and dispersed with an Eiger mill until the average particle diameter of the pigment became 0.5 μm.

After the above components were mixed with each other and stirred for 3 hr, coarse particles were removed with a collector continuous centrifuge to provide a black ink composition. Printing was effected using this ink on Xerox 4024 paper with an intermediate transfer ink jet recording device shown in FIG. 1. In this case, the intermediate transfer drum was provided with an elastic layer of a hydrogenated nitrile-butyl rubber. The temperature of the intermediate transfer drum was 40° C., and the transfer pressure was 0.4 kg/cm.

| Example D2 | |
|---|---|
| C.I. Pigment Red 57:1 | 15.0% |
| 20 n % water dispersion* | |
| Watersol CD-530 | 25.0% |
| (modified epoxy ester colloidal dispersion manufactured by Dainippon Ink and Chemicals, Inc.; resin content = 40% (solid basis), butyl cellosolve + ethyl cellosolve content = 13%) | |
| Glycerin (SP value = 16.5, b.p. = 290° C.) | 7.5% |
| Dipropyelene glycol (SP value = 10.0, b.p. = 232° C.) | 7.5% |
| (When the above solvents are mixed with each other, the SP value of the resultant mixed solvent is 12.4) | |
| Diethanolamine | 5.0% |
| Sodium dioctylsulfosuccinate | 0.1% |
| Sodium dehydroacetate | 0.1% |
| Pure water | 39.8% |
| | 100.0% |

*The water dispersion was prepared in the same manner as that of Example D1, except that the final average particle diameter was 0.7 μm.

After the above components were mixed with each other and stirred for 3 hr, coarse particles were removed with a collector continuous centrifuge to provide a magenta ink composition. Printing was effected using this ink on Xerox 4024 paper with an intermediate transfer ink jet recording device shown in FIG. 1. In this case, the intermediate transfer drum was provided with an elastic layer of a chloroprene rubber. The temperature of the intermediate transfer drum was 50° C., and the transfer pressure was 0.4 Kg/cm.

| Example D3 | |
| --- | --- |
| C.I. Pigment Red 15:3 20% water dispersion* | 15.0% |
| Dispercoll KA8481 (Polyurethane colloidal dispersion manufactured by Bayer; resin content = 40% (solid basis)) | 30.0% |
| Ethylene glycol (SP value = 14.6, b.p. = 198° C.) | 10.0% |
| Diethylene glycol (SP value = 12.1, b.p. = 245° C.) (When the above two solvents are mixed with each other, the SP value of the resultant mixed solvent is 13.3) | 10.0% |
| Triethanolamine | 5.0% |
| OTP-100 (sodium di-2-ethylhexyl-sulfosuccinate manufactured by Nikko Chemicals Co., Ltd.) | 0.1% |
| Sodium dehydroacetate | 0.1% |
| Pure water | 29.8% |
|  | 100.0% |

*The water dispersion was prepared in the same manner as that of Example D1.

After the above components were mixed with each other and stirred for 3 hr, coarse particles were removed with a collector continuous centrifuge to provide a blue ink composition. Printing was effected using this ink on Xerox 4024 paper with an intermediate transfer ink jet recording device shown in FIG. 1. In this case, the intermediate transfer drum was provided with an elastic layer of a styrene-butadiene rubber. The temperature of the intermediate transfer drum was 45° C., and the transfer pressure was 0.4 Kg/cm.

EXAMPLE D4

An ink composition was provided according to the same formulation as that of Example D1, except that the contents of ethylene glycol and triethylene glycol were varied to 10.0% and 10.0%, respectively. A printing test was effected in the same manner as that of Example D1. The SP value of the solvent after mixing was 11.8.

EXAMPLE D5

An ink composition was provided according to the same formulation as that of Example D2, except that diethylene glycol monomethyl ether (SP value=9.5, b.p.=230° C.) was used instead of glycerin. A printing test was effected in the same manner as that of Example C2. The SP value of the solvent after mixing was 9.8.

COMPARATIVE EXAMPLE D1

A printing test was effected using the ink of Example D3 in the same manner as that of Example D3, except that the temperature of the transfer drum was 80° C.

Evaluation D The prints were observed with the naked eye. As a result, in all the prints for Examples D1 to D3, the print edge was clear, and no blurring occurred.

Further, the whole ink image could be transferred from the intermediate transfer drum to the recording paper, and no residual ink image was observed on the intermediate transfer drum.

The density of the print was measured with a Macbeth densitometer. As a result, it was found that the OD value was excellent, that is, 1.53 for Example D1, 1.45 for Example D2, 1.47 for Example D3.

The printed face was rubbed with a wetted cotton cloth under a pressure of 300 g/cm². As a result, no stain of the print was observed.

On the other hand, for Examples D4 and D5 and Comparative Example D1, a part of the ink image remained on the intermediate transfer drum, so that no good print could be provided. However, 1 kg/cm of the transfer pressure provided excellent printings except Comparative Example D1.

What is claimed is:

1. An ink composition for use in intermediate transfer ink jet recording wherein the ink composition is ejected onto an intermediate transfer medium to form an ink image, wherein the ink image is concentrated on the intermediate transfer medium, and wherein the concentrated ink image is then transferred to a recording medium, the composition, comprising:

water which is present as a major solvent;

a colorant consisting essentially of a dispersed pigment present in an amount of about 0.5 to 15% by weight, said pigment having a particle diameter of 25 μm or less;

a colloidal dispersion resin present in an amount of about 0.2 to 20% by weight;

a volatile alkali component present in an amount of about 0.5 to 15% by weight and sufficient for stabilizing the colloidal dispersion resin;

a water-soluble organic solvent, present in an amount of about 0.5 to 30% by weight and sufficient to facilitate transfer of the ink image from the intermediate transfer medium to the recording medium, and a surfactant present in an amount of about 0.01 to 5% by weight and sufficient to lower the surface tension of the ink composition.

2. An intermediate transfer ink jet recording method comprising the steps of:

(a) ejecting the ink composition of claim 1 on an intermediate transfer medium to form an ink image, (b) concentrating said ink image; and (c) transferring said ink image concentrated on said transfer medium to a recording medium.

3. The ink jet recording method according to claim 2, wherein the concentration of said ink image is effected by heating said ink image to a temperature below 50° C.

4. The method as claimed in claim 2 wherein the ink composition has a total content of the pigment and the resin of 5 to 30% by weight based on the ink composition.

5. The method as claimed in claim 2 wherein a weight ratio of the pigment to the resin is in the range of from 1:0.25 to 1:10.

6. The method as claimed in claim 2 wherein the water-soluble organic solvent has a water solubility parameter of 12 or more.

7. The method as claimed in claim 2 wherein the water-soluble organic solvent comprises a mixture of organic solvents and the mixture of organic solvents has a solubility parameter of 12 or more.

8. The method as claimed in claim 7 wherein a solubility parameter of at least one water-soluble organic solvent contained in the mixture of organic solvents is less than 12.

9. An ink jet composition for use in intermediate transfer ink jet recording wherein the ink composition is ejected onto an intermediate transfer medium to form an ink im wherein the ink image is concentrated on the intermediate transfer medium, and wherein the concentrated ink image is then transferred to a recording medium, the composition comprising a) water which is present as a major solvent;

b) a colorant consisting essentially of a dispersed pigment present in an amount of about 0.5 to 15% by weight;

c) a colloidal dispersion resin present in an amount of about 0.2 to 20% by weight;

d) a volatile alkali component present in an amount of about 0.5 to 15% by weight and sufficient for stabilizing the colloidal dispersion resin; and e) a water-soluble organic solvent present in an amount of about 0.5 to 30% by weight and sufficient to accelerate formation of a peeling layer in the ink image which facilitates transfer of the ink image from the intermediate transfer medium to the recording medium, said water soluble organic solvent having a solubility parameter of 12 or more.

10. The ink composition according to claim 9, wherein the water-soluble organic solvent comprises a mixture of organic solvents and the solubility parameter of at least one water-soluble organic solvent contained in the mixture of organic solvents is less than 12.

11. An ink composition as claimed in claim 9 wherein the colloidal dispersion resin is produced by introducing a carboxy group into an emulsion comprising polymer particles dispersed in a solvent or by polymerizing a monomer having a carboxy group whereby to form resultant polymer particles and neutralizing the resultant polymer particles with an alkali to enhance the hydrophilicity of the resultant polymer particles to bring them to a semi-dissolved state.

12. An intermediate transfer ink jet recording method comprising the steps of:

ejecting the ink composition of claim 9 on an intermediate transfer medium to form an ink image.

concentrating said ink image on said transfer medium; and transferring said ink image concentrated on said transfer medium to a recording medium.

13. The method as claimed in claim 12 wherein the ink composition further comprises a surfactant.

* * * * *